United States Patent
Setoguchi

(10) Patent No.: US 9,165,546 B2
(45) Date of Patent: Oct. 20, 2015

(54) RECORDING AND PLAYBACK DEVICE CAPABLE OF REPEATED PLAYBACK, COMPUTER-READABLE STORAGE MEDIUM, AND RECORDING AND PLAYBACK METHOD

(71) Applicant: Casio Computer Co., Ltd., Tokyo (JP)

(72) Inventor: Masaru Setoguchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 391 days.

(21) Appl. No.: 13/714,962

(22) Filed: Dec. 14, 2012

(65) Prior Publication Data

US 2013/0182856 A1  Jul. 18, 2013

(30) Foreign Application Priority Data

Jan. 17, 2012  (JP) .................. 2012-006665

(51) Int. Cl.
*G10H 7/00* (2006.01)
*G06F 17/00* (2006.01)
*H04R 29/00* (2006.01)
(Continued)

(52) U.S. Cl.
CPC .................. *G10H 7/00* (2013.01); *G06F 17/00* (2013.01); *G10H 1/40* (2013.01); *H04R 29/00* (2013.01); *G10H 2250/641* (2013.01); *H04R 3/04* (2013.01); *H04S 7/30* (2013.01); *H04S 2400/15* (2013.01)

(58) Field of Classification Search
USPC .................................................. 84/603–607
IPC ........................................ G10H 2250/641,7/00
See application file for complete search history.

(56) References Cited

U.S. PATENT DOCUMENTS 7,105,735 B2   9/2006  Senoo et al.
7,750,224 B1*  7/2010  Rav-Niv et al. .............. 84/483.1
(Continued)

FOREIGN PATENT DOCUMENTS

CN   102568452 A   7/2012
JP    06175663 A   6/1994
(Continued)

OTHER PUBLICATIONS

Chinese Office Action dated Mar. 3, 2015 issued in counterpart Chinese Application No. 201310010924.5.
(Continued)

*Primary Examiner* — David Warren
(74) *Attorney, Agent, or Firm* — Holtz, Holtz, Goodman & Chick PC

(57) ABSTRACT

In a recording and playback device of the present invention, when input data exceeding a threshold value is supplied, the CPU records input data for an amount of time corresponding to a single beat in an area specified by syllable number SPLIT in an input buffer IB of the RAM, and after incrementing the syllable number SPLIT, waits until the recorded data becomes silent. The CPU repeats this series of processing until the value of the incremented syllable number SPLIT reaches "4", and thereby stores input data recorded for an amount of time corresponding to a single beat in each input buffer IB(1) to IB(4) corresponding to syllable numbers SPLIT1 to SPLIT4. Then, the CPU copies the input data to the recording area of the RAM such that these input data are sequentially connected and formed into loop data for an amount of time corresponding to a single bar.

13 Claims, 7 Drawing Sheets

(51) Int. Cl.
  *G10H 1/40* (2006.01)
  *H04R 3/04* (2006.01)
  *H04S 7/00* (2006.01)

(56) References Cited

U.S. PATENT DOCUMENTS

| | | |
|---|---|---|
| 8,338,686 B2 | 12/2012 | Mann et al. |
| 8,492,634 B2 | 7/2013 | Savo et al. |
| 8,772,618 B2 | 7/2014 | Matsumoto |
| 2004/0200336 A1 | 10/2004 | Senoo et al. |
| 2005/0108357 A1* | 5/2005 | Sano ............................ 709/217 |
| 2006/0225561 A1* | 10/2006 | Kobayashi et al. ............. 84/604 |
| 2007/0282467 A1* | 12/2007 | Rodrigues et al. .............. 700/83 |
| 2008/0190271 A1* | 8/2008 | Taub et al. ...................... 84/645 |
| 2008/0250914 A1* | 10/2008 | Reinhart et al. ................ 84/645 |
| 2008/0271592 A1* | 11/2008 | Beckford ........................ 84/645 |
| 2009/0216354 A1* | 8/2009 | Ong et al. ........................ 700/94 |
| 2010/0305732 A1 | 12/2010 | Serletic et al. |
| 2010/0307321 A1 | 12/2010 | Mann et al. |
| 2010/0319517 A1 | 12/2010 | Savo et al. |
| 2010/0322042 A1 | 12/2010 | Serletic et al. |
| 2011/0011243 A1* | 1/2011 | Homburg ........................ 84/612 |
| 2011/0011245 A1* | 1/2011 | Adam et al. .................... 84/612 |
| 2011/0011246 A1* | 1/2011 | Buskies et al. ................. 84/613 |
| 2011/0015767 A1* | 1/2011 | Homburg et al. ............... 700/94 |
| 2011/0041672 A1* | 2/2011 | Chan et al. ...................... 84/645 |
| 2011/0175915 A1* | 7/2011 | Gehring ........................ 345/440 |
| 2011/0247479 A1* | 10/2011 | Helms et al. ................... 84/613 |
| 2011/0247480 A1* | 10/2011 | Gehring et al. ................. 84/613 |
| 2011/0259176 A1* | 10/2011 | Pillhofer et al. ............. 84/470 R |
| 2011/0307084 A1* | 12/2011 | Gehring et al. ................ 700/94 |
| 2012/0050176 A1* | 3/2012 | Chin .............................. 345/173 |
| 2012/0097014 A1 | 4/2012 | Matsumoto |
| 2012/0220187 A1* | 8/2012 | Hillis et al. .................... 446/297 |
| 2012/0255424 A1* | 10/2012 | Matsumoto ..................... 84/611 |
| 2013/0053993 A1* | 2/2013 | Setoguchi ........................ 700/94 |
| 2013/0182856 A1* | 7/2013 | Setoguchi ........................ 381/56 |
| 2013/0220102 A1 | 8/2013 | Savo et al. |
| 2013/0305906 A1* | 11/2013 | Kinter ............................. 84/613 |
| 2014/0053711 A1* | 2/2014 | Serletic et al. ................. 84/611 |
| 2014/0140536 A1* | 5/2014 | Serletic et al. ................. 381/98 |
| 2014/0251116 A1* | 9/2014 | Peterson ........................ 84/645 |
| 2014/0254834 A1* | 9/2014 | Umeo ........................... 381/119 |
| 2014/0270263 A1* | 9/2014 | Fejzo et al. .................... 381/119 |
| 2014/0301573 A1* | 10/2014 | Kiely et al. .................... 381/119 |

FOREIGN PATENT DOCUMENTS

| | | |
|---|---|---|
| JP | 2011-112679 A | 6/2011 |
| WO | 2010141504 A1 | 12/2010 |

OTHER PUBLICATIONS

PDF of the screen capture from web.archive.org to show the Zoom G2Nu Operation manual available to public Apr. 11, 2011.

Zoom Corporation; G2Nu/G2.1Nu Operation Manual; retrieved on Jul. 23, 2013 [online]; URL: http://web.archive.org/web/20110828222409/http://www.zoom.co.jp/download/J_G2Nu_G21Nu.pdf.

Related U.S. Appl. No. 13/598,216; First Named Inventor: Masaru Setoguchi; Title: "Recording and Playback Device, Storage Medium, and Recording and Playback Method"; Filed: Aug. 29, 2012.

* cited by examiner

US 9,165,546 B2

RECORDING AND PLAYBACK DEVICE CAPABLE OF REPEATED PLAYBACK, COMPUTER-READABLE STORAGE MEDIUM, AND RECORDING AND PLAYBACK METHOD

CROSS-REFERENCE TO RELATED APPLICATION

This application is based upon and claims the benefit of priority from the prior Japanese Patent Application No. 2012-006665, filed Jan. 17, 2012, the entire contents of which is incorporated herein by reference.

BACKGROUND OF THE INVENTION

1. Field of the Invention

The present invention relates to a recording and playback device and a program that, while performing repeated playback of material recorded over a certain period of time, can overdub new material in the material of that repeated playback.

2. Description of the Related Art

A technology is known which, while performing repeated playback of material recorded over a certain period of time, overdubs new material in the material of that repeated playback.

As this type of technology, Japanese Patent Application Laid-open (Kokai) Publication No. 2011-112679 discloses an automatic musical performance device that performs repeated playback of an event recorded layer in a recording area composed of a plurality of layers (tracks), and performs overdubbing to record an event generated in response to a musical performance operation on a newly designated layer during the repeated playback, whereby a musical accompaniment pattern to which musical modifications have been made according to a user's desire is created through repeated improvisatorial trial and error.

In the above-described technology disclosed in Japanese Patent Application Laid-open (Kokai) Publication No. 2011-112679, the material to record (archive) is a Musical Instrument Digital Interface (MIDI) event generated in response to a musical performance operation. However, in recent years, a recording and playback device referred to as a looper (loop sampler) has been put to practical use, which records sampled audio data, musical sound data generated by a sound source or the like over a certain period of time as sound recording material. A musical phrase is created by successively overdubbing new material while performing repeated playback of the recorded material.

In this recording and playback device referred to as a looper, a rhythm guide sound for keeping tempo is initially recorded to create loop data, in an unrecorded state (initial state) in which no sound has been recorded. Note that the loop data herein refers to recording data by which repeated playback is performed, such as a rhythm pattern, etc.

Usually, this type of recording and playback device has a function for generating a click sound (metronome sound) or a rhythmic sound, and mainly creates loop data by performing an initial recording using a click sound or a rhythmic sound generated by this function. Accordingly, if the recording is not started and stopped at an exact timing, loop data having an exact tempo cannot be created. In other words, there is a problem in that loop data having the exact tempo cannot be easily created.

SUMMARY OF THE INVENTION

The present invention has been conceived in light of the above-described problem, and an object of the present invention is to provide a recording and playback device and a program by which loop data having an exact tempo can be easily created.

In order to achieve the above-described object, in accordance with one aspect of the present invention, there is provided a recording and playback device comprising: a sound data acquiring section which acquires a plurality of sound data having a predetermined time length each time amplitude of inputted sound data exceeds a threshold value; a loop data forming section which forms loop data by connecting the plurality of sound data acquired by the sound data acquiring section; and a repeat playback section which performs repeated playback of the loop data formed by the loop data forming section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of the present invention will hereinafter be described with reference to the drawings.

A. Structure

Figure 1:
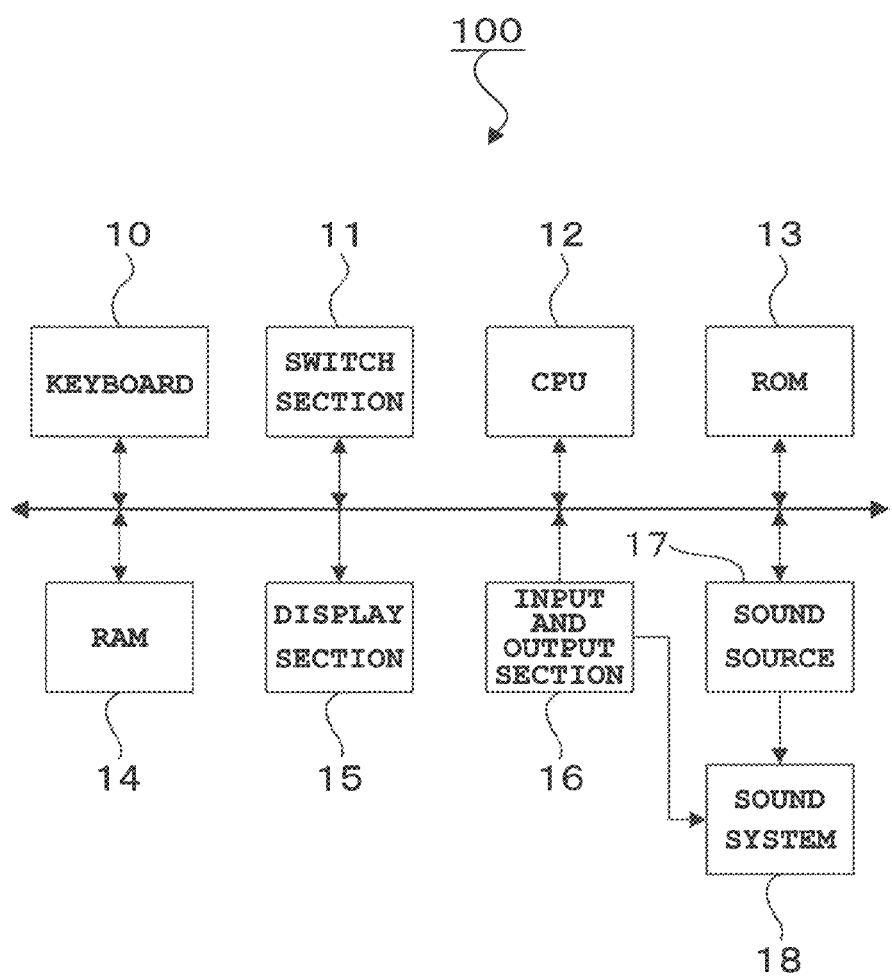
FIG. 1 is a block diagram showing the overall structure of an electronic musical instrument 100 including a recording and playback device according to an embodiment.

FIG. 1 is a block diagram showing the overall structure of an electronic musical instrument 100 including a recording and playback device (looper function) according to an embodiment of the present invention. A keyboard 10 in FIG. 1 generates musical performance information, such as a key-ON/key-OFF signal, a key number, and velocity, in response to a musical performance operation (key depression and release operation). A switch section 11 of FIG. 1 has various operating switches arranged on a device panel, and generates a switch event corresponding to the type of an operated switch. As operating switches related to the scope of the present invention, operating switches used to set "tempo (Beats per Minute [BPM] value)" and "meter" serving as operating parameters in initial recording processing described hereafter, and operating switches of the recording and playback device (looper function) are included.

Here, an example of the operating switches related to the recording and playback device (looper function) will be described with reference to FIG. 2. A REC/OVERDUB switch 11a in FIG. 2 generates an event for giving an instruction to start or stop recording or overdubbing based on a depression operation. Near the REC/OVERDUB switch 11a there is provided a red Light Emitting Diode (LED) 11a-1 that flashes in a recording standby state and is lit in a recording state, in response to a depression operation of the REC/OVERDUB switch 11a.

Figure 2:
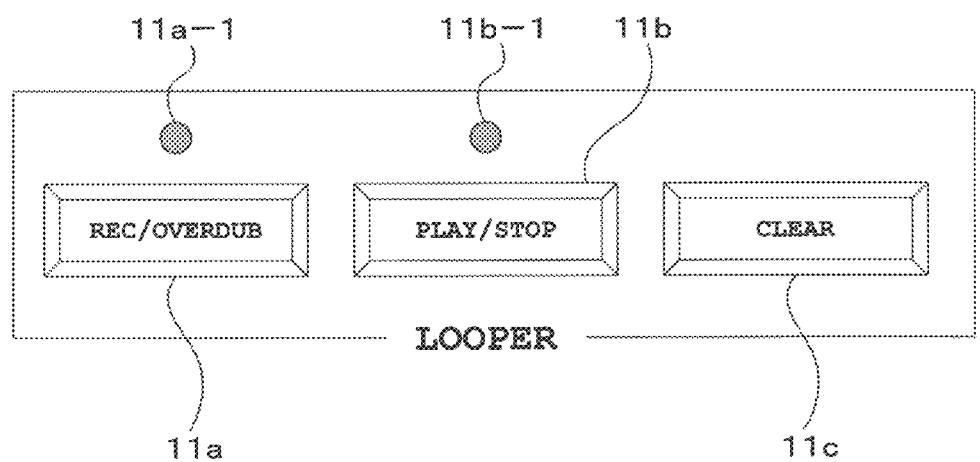
FIG. 2 is a diagram showing an example of the structure of operating switches related to the recording and playback device.

A PLAY/STOP switch 11b in FIG. 2 generates an event for giving an instruction to start or stop playback based on a depression operation. Near the PLAY/STOP switch 11b there is provided a blue LED 11b-1 that is lit in a playback state. During overdubbing in which recording is performed while playback is being performed, the red LED 11a-1 and the blue LED 11b-1 are both lit. A CLEAR switch 11c in FIG. 2 generates an event for giving an instruction to delete recorded loop data based on a depression operation.

In the configuration of the present embodiment shown in FIG. 1, a Central Processing Unit (CPU) 12 controls each section of the device based on switch events generated by the switch section 11. The details of the characteristic processing operations of the CPU 12 related to the scope of the present invention will be described later. A Read-Only Memory (ROM) 13 of FIG. 1 stores the data of various programs to be loaded into the CPU 12. The various programs herein include the main routine and the initial recording processing described later.

Figure 3:
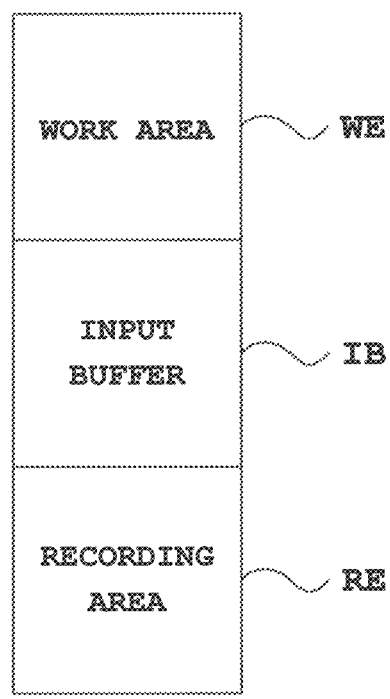
FIG. 3 is a memory map showing a memory configuration of a RAM 14.

A Random Access Memory (RAM) 14 in FIG. 1 includes a work area WE, an input buffer IB, and a recording area RE, as shown in FIG. 3. The work area WE of the RAM 14 temporarily stores various register and flag data that are used for processing by the CPU 12. The input buffer IB of the RAM 14 temporarily stores audio data that is loaded via an input and output section 16 described later or musical sound data that is outputted from a sound source 17, under the control of the CPU 12. The recording area RE of the RAM 14 has a plurality of recording tracks to which data can be written during readout. During recording, audio data read out from the input buffer IB is recorded in an unrecorded track. Then, during playback, this recorded track is repeatedly read out in parallel.

A display section 15 in FIG. 1 displays on a screen the operating status, the setting status, and the like of the device based on display control signals supplied from the CPU 12. The input and output section 16 has an Analog-to-Digital (A/D) converter, and, for example, stores audio data acquired by sampling audio signals inputted from a microphone (not shown) in the input buffer IB of the RAM 14, or outputs audio data read out by time-sharing from each recorded track in the recording area RE of the RAM 14 to a sound system 18, under the control of the CPU 12.

The sound source 17 is configured by a known waveform memory readout system. This sound source 17 generates musical sound data based on a musical sound command (note event) generated by the CPU 12 in accordance with play information supplied from the keyboard 10, or generates rhythmic sound data in accordance with a user-designated rhythm pattern. The sound system 18 performs the Digital-to-Analog (D/A) conversion of musical sound data outputted from the sound source 17 or audio data outputted from the input and output section 16, and after performing filtering on the converted data to remove unwanted noise and the like, amplifies its level and emits the sound from a speaker.

B. Operations

Next, operations of the recording and playback device (looper function) included in the electronic musical instrument 100 structured as described above will be described. In the descriptions below, first, the main routine is described with reference to FIG. 4, and then the operations of the initial recording processing are described with reference to FIG. 5 to FIG. 7.

(1) Operations in the Main Routine

Figure 4:
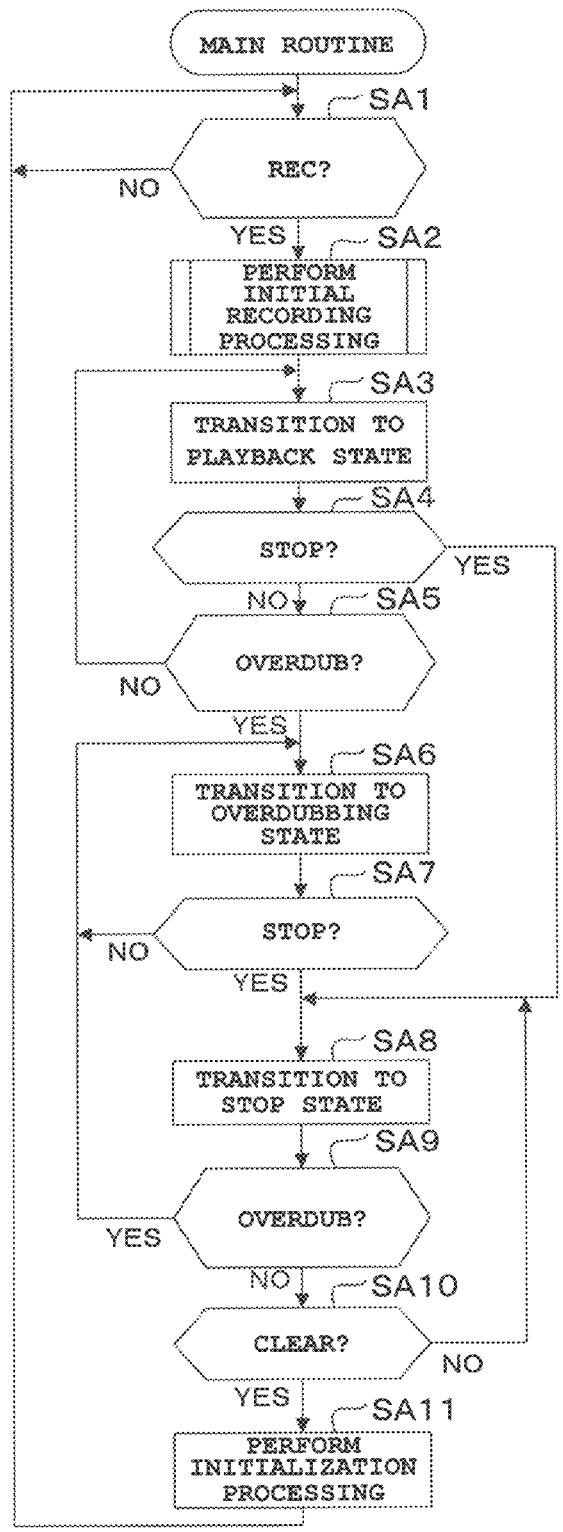
FIG. 4 is a flowchart of the operations of the main routine.

FIG. 4 is a flowchart of the operations in the main routine. First, at Step SA1, the CPU 12 waits until the REC/OVERDUB switch 11a is press-operated. When the REC/OVERDUB switch 11a is press-operated, the judgment result at Step SA1 is "YES", and therefore the CPU 12 performs the initial recording processing at Step SA2.

In the initial recording processing, when input data exceeding a threshold value is inputted, the CPU 12 starts recording, and after recording input data for an amount of time corresponding to a single beat in an area specified by syllable number SPLIT1 in the input buffer IB of the RAM 14, increments the syllable number SPLIT, and waits until the recorded input data becomes silent, as described later in detail. The CPU 12 repeats this series of processing operations until the value of the incremented syllable number SPLIT reaches "4", and thereby stores input data recorded for an amount of time corresponding to a single beat (0.5 seconds) in each input buffer IB(1) to IB(4) corresponding to the syllable numbers SPLIT1 to SPLIT4. Then, the CPU 12 copies the input data in the input buffers IB(1) to IB(4) to the recording area RE of the RAM 14 such that these input data are sequentially connected and formed into loop data for an amount of time corresponding a single bar.

Next, at Step SA3, the current state transitions to a playback state in which the loop data for an amount of time corresponding a single bar copied in the recording area RE of the RAM 14 at Step SA2 is repeatedly replayed. Then, at Step SA4, the CPU 12 judges whether or not the PLAY/STOP switch 11b has been press-operated in the playback state. When judged that the PLAY/STOP switch 11b has been press-operated, since the judgment result is "YES", the CPU 12 proceeds to Step SA8 described hereafter, and the current state transitions to a stop state.

Conversely, when judged that the PLAY/STOP switch 11b has not been press-operated in the playback state, since the judgment result at Step SA4 is "NO", the CPU 12 proceeds to Step SA5 and judges whether or not the RECORD/OVERDUB switch 11a has been press-operated. When judged that the RECORD/OVERDUB switch 11a has not been press-operated, since the judgment result is "NO", the CPU 12 returns to Step SA3 and remains in the playback state.

Conversely, when judged that the REC/OVERDUB switch 11 has been press-operated in the playback state, since the judgment result at Step SA5 is "YES", the CPU 12 proceeds to Step SA6 and the current state transitions to a overdubbing state in which, while the initially recorded loop data is being repeatedly replayed, input data to be newly recorded is overdubbed onto the loop data that is being repeatedly replayed.

Next, at Step SA7, the CPU 12 judges whether or not the PLAY/STOP switch 11b has been press-operated in the overdubbing state. When judge that the PLAY/STOP switch 11b has not been press-operated in the overdubbing state and since the judgment result is "NO", the CPU 12 returns to Step SA6 and the overdubbing state is maintained.

Conversely, when judged that the PLAY/STOP switch 11b has been press-operated in the overdubbing state, since the judgment result at Step SA7 is "YES", the CPU 12 proceeds to Step SA8 and the current state transitions to the stop state in which repeated playback and overdubbing are stopped.

Then, at Step SA9, the CPU 12 judges whether or not the REC/OVERDUB switch 11a has been press-operated in the stop state. When judged that the REC/OVERDUB switch 11a has been press-operated, since the judgment result is "YES", the CPU 12 returns to Step SA6, and the current state reenters the overdubbing state.

When judged that the REC/OVERDUB switch 11a has not been press-operated in the stop state, since the judgment result at Step SA9 is "NO", the CPU 12 proceeds to Step SA10, and judges whether or not the CLEAR switch 11c has been press-operated in the stop state. When judged that the CLEAR switch 11c has not been press-operated, since the judgment result is "NO", the CPU 12 returns to Step SA8, and the stop state is maintained.

Conversely, when judged that the CLEAR switch 11c has been press-operated in the stop state, the judgment result at Step SA10 is "YES", and therefore the CPU 12 proceeds to Step SA11. At Step SA11, the CPU 12 performs initialization processing to reset the work area WE, the input buffer IB, and the recording area RE of the RAM 14 to zero, and returns to Step SA1.

(2) Operations of the Initial Recording Processing

Figure 5:
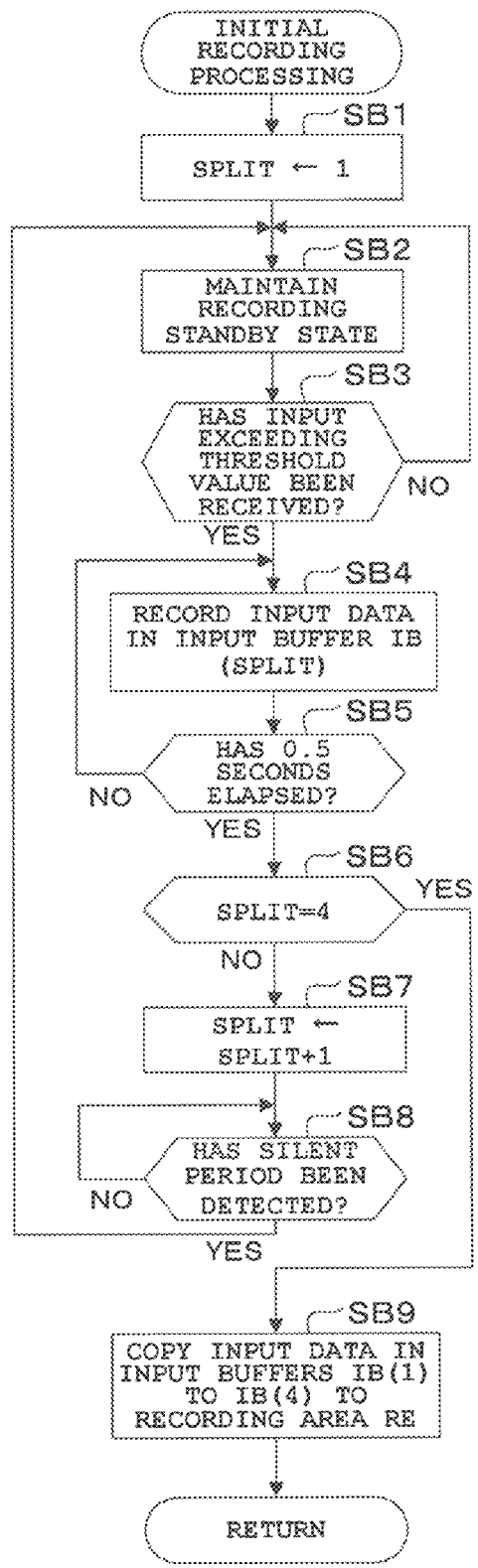
FIG. 5 is a flowchart of the operations of initial recording processing.

FIG. 5 is a flowchart of the operations of the initial recording processing. When the initial recording processing is performed at Step SA2 of the above-described main routine, the CPU 12 proceeds to Step SB1 and stores an initial value "1" in a register SPLIT. Note that the contents of the register SPLIT will hereinafter be referred to as the syllable number SPLIT. Next, at Step SB2 and Step SB3, the CPU 12 initializes the input buffer IB of the RAM 14 and maintains a recording standby state until input data exceeding a threshold value is supplied. Note that the input data herein refers to data to be recorded. Specifically, the data is audio data sampled via the input and output section 16 or musical sound data outputted from the sound source 17. The selection of the input data to be recorded is performed by user operation.

When input data exceeding a threshold value is supplied, since the judgment result at Step SB3 is "YES", the CPU 12 proceeds to Step SB4 and starts a recording operation to store the input data in an area specified by the syllable number SPLIT in the input buffer IB of the RAM 14. Note that the input data to be recorded herein is a sound that is easily audible as a rhythm guide sound for keeping tempo. This sound is preferably a rhythmic sound, such as that of a bass drum, a snare drum, a cymbal, or a hi-hat, but is not limited thereto and may be a hand clap or a tapping sound.

Next, at Step SB5, the CPU 12 judges whether or not an amount of time corresponding to a single beat has elapsed from the start of the recording. Note that the amount of time corresponding to a single beat herein is an amount of time determined based on tempo (BPM value) and meter set in advance by user operation. In the example of the present embodiment, since the tempo (BPM value) has been set to "120" and the meter has been 4/4 time, the amount of time corresponding to a single beat is "0.5 seconds" When judged that the amount of time corresponding to a single beat (0.5 seconds) has not elapsed from the start of the recording, since the judgment result at Step SB5 is "NO", the CPU 12 returns to Step SB4 and continues the recording operation.

Conversely, when judged that the amount of time corresponding to a single beat (0.5 seconds) has elapsed from the start of the recording, since the judgment result at Step SB5 is "YES", the CPU 12 proceeds to Step SB6 and judges whether or not the syllable number SPLIT is "4", or in other words, whether or not input data for an amount of time corresponding to a single bar has been recorded. When judged that input data for an amount of time corresponding to a single bar has not been recorded, since the judgment result is "NO", the CPU 12 proceeds to Step SB7. At Step SB7, the CPU 12 increments and advances the syllable number SPLIT.

Figure 6:
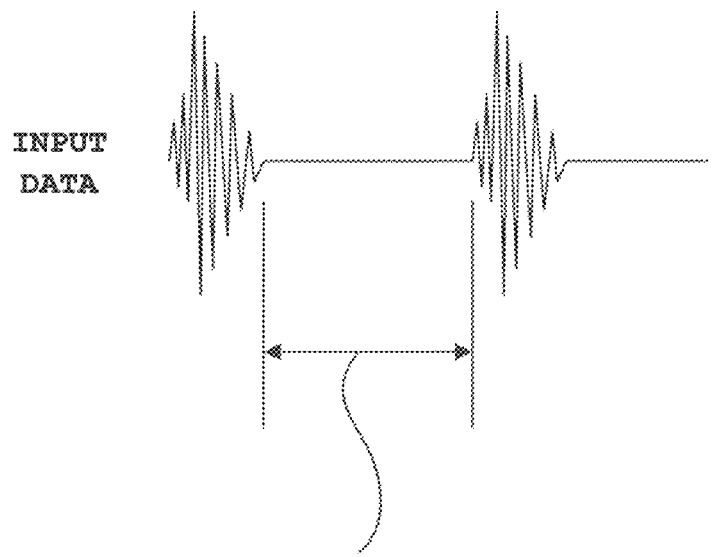
FIG. 6 is a diagram for describing a silent period.

Next, at Step SB8, the CPU 12 waits until a silent period which continues for an amount of time corresponding to a single beat and during which the recorded input data is silent elapses as shown in FIG. 6. Note that the silent period herein refers to a period during which an amplitude level that is half or less than the above-described threshold value continues. This silent period is provided to prevent an unintentional recording operation that occurs when the user stops a sound being emitted but the reverberant sound exceeds the threshold value during standby for recording the next syllable.

Then, when the silent period continues for an amount of time corresponding to a single beat (0.5 seconds) and is detected thereby, since the judgment result at Step SB8 is "YES", the CPU 12 returns to Step SB2. Hereafter, the CPU 12 repeats the operations at Step SB2 to Step SB8 until the value of the syllable number SPLIT reaches "4". As a result, input data recorded for an amount of time corresponding to a single beat (0.5 seconds) is stored in each area IB(1) to IB(4) corresponding to the syllable numbers SPLIT1 to SPLIT4, in the input buffer IB of the RAM 14.

Figure 7:
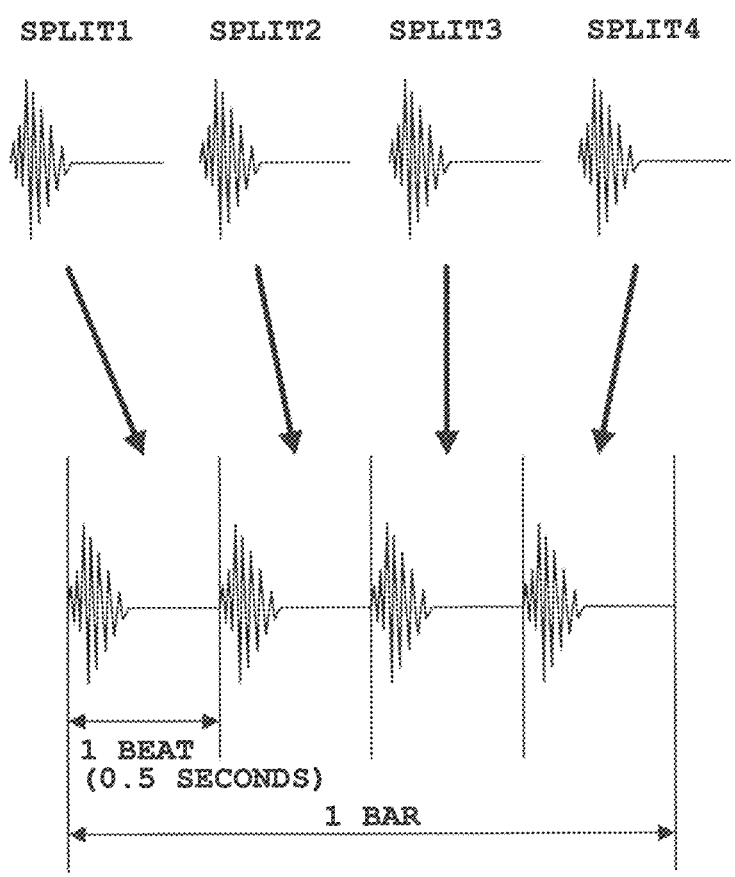
FIG. 7 is a diagram for describing the operations of the initial recording processing.

When the input data corresponding to the syllable numbers SPLIT1 to SPLIT4 are recorded and since the judgment result at Step SB6 is "YES", the CPU 12 proceeds to Step SB9. At Step SB9, the CPU 12 copies the input data corresponding to the syllable numbers SPLIT1 to SPLIT4 stored in the input buffers IB(1) to IB(4) of the RAM 14 to the recording area RE of the RAM 14 such that these input data are sequentially connected and formed into loop data for an amount of time corresponding to a single bar, as shown in FIG. 7.

As described above, when input data exceeding a threshold value is supplied in the initial recording processing, the CPU 12 starts recording, and after recording input data for an amount of time corresponding to a single beat in an area specified by the syllable number SPLIT1 in the input buffer IB of the RAM 14, increments the syllable number SPLIT, and waits until the recorded input data becomes silent. The CPU 12 repeats these processing operations until the value of the incremented syllable number SPLIT reaches "4", and thereby stores input data recorded for an amount of time corresponding to a single beat (0.5 seconds) in each input buffer IB(1) to IB(4) corresponding to the syllable numbers SPLIT1 to SPLIT4. Then, the CPU 12 copies the input data in the input buffers IB(1) to IB(4) to the recording area RE of the RAM 14 such that these input data are sequentially connected and formed into loop data for an amount of time corresponding to a single bar.

As described above, in the present embodiment, when the REC/OVERDUB switch 11a is press-operated in an unrecorded state (initial state) where no sound is recorded in the recording area RE of the RAM 14 and input data exceeding a threshold value is supplied, the CPU 12 records input data for an amount of time corresponding to a single beat in an area specified by the syllable number SPLIT in the input buffer IB of the RAM 14, and after incrementing the syllable number SPLIT, waits until the recorded input data becomes silent.

The CPU 12 repeats these processing operations until the value of the incremented syllable number SPLIT reaches "4", and thereby stores input data recorded for an amount of time corresponding to a single beat (0.5 seconds) in each input buffer IB(1) to IB(4) corresponding to the syllable numbers SPLIT1 to SPLIT4. Then, the CPU 12 copies the input data in the input buffers IB(1) to IB(4) to the recording area RE of the RAM 14 such that these input data are sequentially connected and formed into loop data for an amount of time corresponding to a single bar. As a result of this configuration, loop data having an exact tempo can be easily created. In addition, in applications such as vocal percussion, the user is not required to vocalize in time with the rhythm. Therefore, a rhythm pattern can be more easily created. Moreover, since the silent period is detected between syllables, unintentional progress of the recording can be prevented.

In the above-described embodiment, an example has been described in which a syllable for an amount of time corresponding to a single beat is recorded four times to create loop data for an amount of time corresponding to a single bar. However, the present invention is not limited thereto, and a configuration may be adopted in which a syllable for an amount of time corresponding to a plurality of beats is recorded a plurality of times to create loop data for an amount of time corresponding to a plurality of bars.

Also, in the present embodiment, a single syllable has a fixed length set in advance. However, the present invention is not limited thereto, and the syllable may have a random time length. For example, by a configuration being adopted in which the timing at which audio input becomes silent is considered to be the end of a recorded syllable, a syllable having a random time length can be set.

While the present invention has been described with reference to the preferred embodiments, it is intended that the invention be not limited by any of the details of the description therein but includes all the embodiments which fall within the scope of the appended claims.

What is claimed is:

1. A recording and playback device comprising:
   a sound data acquiring section which acquires a plurality of sound data having a predetermined time length each time amplitude of inputted sound data exceeds a threshold value, to acquire a plurality of sound data;
   a loop data forming section which forms loop data by connecting the plurality of sound data acquired by the sound data acquiring section; and
   a repeat playback section which performs repeated playback of the loop data formed by the loop data forming section.

2. The recording and playback device according to claim 1, further comprising:
   a setting section which sets tempo and meter,
   wherein the sound data acquiring section acquires a plurality of sound data having a time length corresponding to a beat determined based on the tempo and meter, and
   wherein the loop data forming section forms loop data by connecting the plurality of sound data, which amount to a predetermined number of bars.

3. The recording and playback device according to claim 1, wherein the sound data acquiring section comprises:
   a silent period detecting section which detects a silent period during which currently acquired sound data is silent; and
   a start instructing section which gives an instruction to start acquiring sound data that is inputted next, when the silent period detecting section detects the silent period in the currently acquired sound data.

4. A non-transitory computer-readable storage medium having stored thereon a program that is executable by a computer in a recording and playback device, the program being executable by the computer to perform functions comprising:
   sound data acquisition processing for acquiring sound data having a predetermined time length each time amplitude of inputted sound data exceeds a threshold value, to acquire a plurality of sound data;
   loop data formation processing for forming loop data by connecting the plurality of sound data acquired by the sound data acquisition processing; and
   repeat playback processing for performing repeated playback of the loop data formed by the loop data formation processing.

5. The non-transitory computer-readable storage medium according to claim 4, wherein the functions further comprise setting processing for setting tempo and meter,
   wherein the sound data acquisition processing acquires a plurality of sound data having a time length corresponding to a beat determined based on the tempo and meter, and
   wherein the loop data formation processing forms loop data by connecting the plurality of sound data, which amount to a predetermined number of bars.

6. The non-transitory computer-readable storage medium according to claim 4, wherein the sound data acquisition processing comprises:
   silent period detection processing for detecting a silent period during which currently acquired sound data is silent; and
   start instruction processing for giving an instruction to start acquiring sound data that is inputted next, when the silent period detection processing detects the silent period in the currently acquired sound data.

7. A recording and playback method comprising:
   a sound data acquiring step of acquiring sound data having a predetermined time length each time amplitude of inputted sound data exceeds a threshold value, to acquire a plurality of sound data;
   a loop data forming step of forming loop data by connecting the plurality of sound data acquired in the sound data acquiring step; and
   a repeat playback step of performing repeated playback of the loop data formed in the loop data forming step.

8. The recording and playback method according to claim 7, further comprising:
   a setting step of setting tempo and meter,
   wherein the sound data acquiring step acquires a plurality of sound data having a time length corresponding to a beat determined based on the tempo and meter, and
   wherein the loop data forming step forms loop data by connecting the plurality of sound data amounting to a predetermined number of bars.

9. The recording and playback method according to claim 7, wherein the sound data acquiring step comprises:
   a silent period detecting step of detecting a silent period during which currently acquired sound data is silent; and
   a start instructing step of giving an instruction to start acquiring sound data that is inputted next, when the silent period in the currently acquired sound data is detected in the silent period detecting step.

10. An electric musical instrument comprising:
    a sound source which generates musical sound data based on musical performance information;
    a sound data acquiring section which acquires sound data having a predetermined time length each time an amplitude of inputted sound data exceeds a threshold value, to acquire a plurality of sound data;
    a loop data forming section which forms loop data by connecting the plurality of sound data acquired by the sound data acquiring section;
    a repeat section which performs repeated output of the loop data formed by the loop data forming section; and
    a sound system which emits a sound based on the musical sound data and the repeated loop data.

11. The electric musical instrument according to claim 10, further comprising:
    a musical performance information generating section which generates musical performance information in response to a musical performance operation, wherein the sound source generates musical sound data based on the musical performance information generated by the musical performance information generating section.

12. The electric musical instrument according to claim 10, further comprising:

a setting section which sets tempo and meter, wherein the sound data acquiring section acquires a plurality of sound data having a time length corresponding to a beat determined based on the tempo and meter, and wherein the loop data forming section forms loop data by connecting the plurality of sound data, which amount to a predetermined number of bars.

13. The electric musical instrument according to claim 10, wherein the sound data acquiring section comprises:

a silent period detecting section which detects a silent period during which currently acquired sound data is silent; and a start instructing section which gives an instruction to start acquiring sound data that is inputted next, when the silent period detecting section detects the silent period in the currently acquired sound data.

\* \* \* \* \*

UNITED STATES PATENT AND TRADEMARK OFFICE
CERTIFICATE OF CORRECTION

PATENT NO. : 9,165,546 B2  
APPLICATION NO. : 13/714962  
DATED : October 20, 2015  
INVENTOR(S) : Masaru Setoguchi Page 1 of 1

It is certified that error appears in the above-identified patent and that said Letters Patent is hereby corrected as shown below:

In the Claims:

Column 7, claim 1, line 2, after "acquires" delete "a plurality of"

Signed and Sealed this
Fifteenth Day of March, 2016

Michelle K. Lee
*Director of the United States Patent and Trademark Office*